United States Patent
Di Iorio et al.

(10) Patent No.: US 10,651,482 B2
(45) Date of Patent: May 12, 2020

(54) ELECTROCHEMICAL CELL CARRIER SEAL AND PROCESSES FOR MANUFACTURING AND FITTING SAID SEAL

(71) Applicant: COMMISSARIAT A L'ENERGIE ATOMIQUE ET AUX ENERGIES ALTERNATIVES, Paris (FR)

(72) Inventors: Stéphane Di Iorio, Lans-en-vercors (FR); Bruno Oresic, Tullins (FR); Julien Petit, Saint Martin le Vinoux (FR); Magali Reytier, Villard de Lans (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 31 days.

(21) Appl. No.: 15/037,158

(22) PCT Filed: Dec. 2, 2014

(86) PCT No.: PCT/IB2014/066518
§ 371 (c)(1),
(2) Date: May 17, 2016

(87) PCT Pub. No.: WO2015/083076
PCT Pub. Date: Jun. 11, 2015

(65) Prior Publication Data
US 2016/0285113 A1   Sep. 29, 2016

(30) Foreign Application Priority Data

Dec. 4, 2013 (FR) .................................... 13 62100

(51) Int. Cl.
*H01M 8/0271* (2016.01)
*H01M 8/0273* (2016.01)
(Continued)

(52) U.S. Cl.
CPC ............ *H01M 8/0273* (2013.01); *C25B 1/08* (2013.01); *C25B 9/20* (2013.01); *H01M 8/028* (2013.01);
(Continued)

(58) Field of Classification Search
None
See application file for complete search history.

(56) References Cited

U.S. PATENT DOCUMENTS 2,206,489 A * 7/1940 Hans ..................... C04B 37/025
174/152 GM
2004/0048137 A1   3/2004 Chou et al.
(Continued)

FOREIGN PATENT DOCUMENTS

EP   1246283 A2 * 10/2002 .......... H01M 8/0271
FR   2 988 916 A1   10/2013

OTHER PUBLICATIONS

English translation of EP-1246283-A2 (Year: 2002).*
(Continued)

*Primary Examiner* — Lucas J. O'Donnell
(74) *Attorney, Agent, or Firm* — Christensen O'Connor Johnson Kindness PLLC

(57) ABSTRACT

A seal is mountable in contact with two metal carriers of an electrochemical device, in particular a solid oxide fuel cell (SOFC) or a high-temperature solid oxide electrolyser cell (SOEC) for electrolysis of water vapour. This seal comprises a means for making the seal impermeable, comprising at least one vitreous material; and an electrically insulating supporting means that supports the impermeable means and that has two parallel main faces, an external peripheral edge and an internal peripheral edge, the seal being able to be mounted against these carriers via these main faces, which are covered with the impermeable means. The impermeable (Continued)

Figure 1:
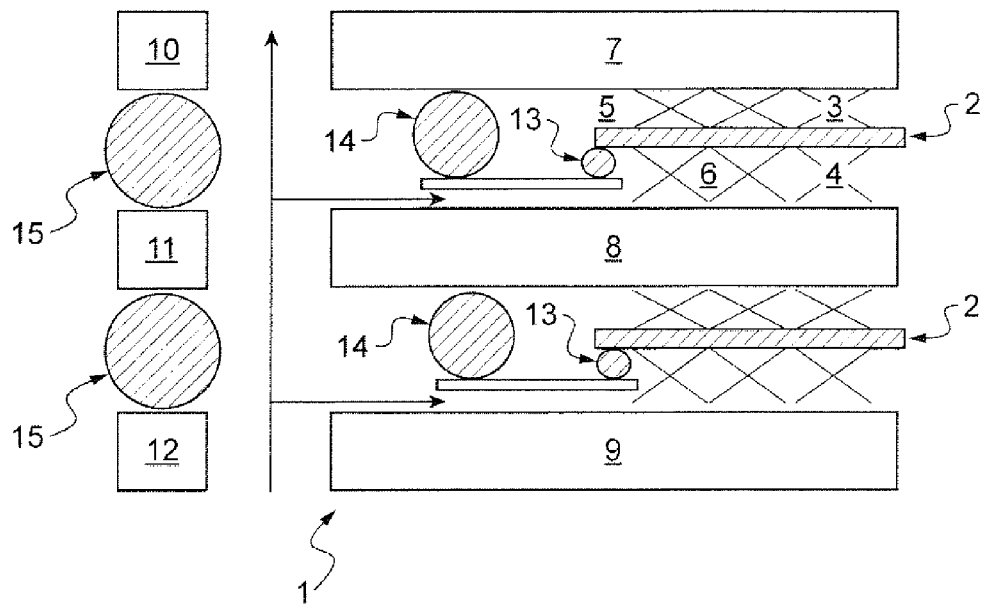

means partitions the supporting means between these internal and external edges while extending continuously from one of the main faces to the other through the supporting means, so that the impermeable means directly connects these carriers to each other.

17 Claims, 6 Drawing Sheets

(51) Int. Cl.
    *H01M 8/2425*    (2016.01)
    *H01M 8/0258*    (2016.01)
    *H01M 8/2457*    (2016.01)
    *C25B 1/08*    (2006.01)
    *C25B 9/20*    (2006.01)
    *H01M 8/0286*    (2016.01)
    *H01M 8/028*    (2016.01)
    *H01M 8/1231*    (2016.01)
    *H01M 8/0282*    (2016.01)
    *H01M 8/1213*    (2016.01)
    *H01M 8/124*    (2016.01)

(52) U.S. Cl.
    CPC ....... *H01M 8/0258* (2013.01); *H01M 8/0282* (2013.01); *H01M 8/0286* (2013.01); *H01M 8/1213* (2013.01); *H01M 8/1231* (2016.02); *H01M 8/2425* (2013.01); *H01M 8/2457* (2016.02); *H01M 2008/1293* (2013.01); *H01M 2300/0074* (2013.01); *Y02E 60/366* (2013.01); *Y02P 70/56* (2015.11)

(56) References Cited

U.S. PATENT DOCUMENTS

2010/0285394 A1    11/2010    Lee et al.
2013/0196253 A1*   8/2013    De Rose ............. H01M 8/2425
                                                           429/510

OTHER PUBLICATIONS

Written Opinion of the International Searching Authority dated Feb. 19, 2015, issued in corresponding International Application No. PCT/IB2014/066518, filed Dec. 2, 2014, 10 pages.

International Preliminary Report on Patentability dated Jun. 7, 2016 issued in corresponding International Application No. PCT/IB2014/066518, filed Dec. 2, 2014, 1 page.

Chou, Y.-S., and J.W. Stevenson, "Compressive Mica Seals for Solid Oxide Fuel Cells," Journal of Materials Engineering and Performance 15(4):414-421, Aug. 2006.

Chou, Y.-S., et al., "Thermal Cycle Stability of a Novel Glass—Mica Composite Seal for Solid Oxide Fuel Cells: Effect of Glass Volume Fraction and Stresses," Journal of Power Sources 152:168-174, Dec. 2005.

Fergus, J.W., "Sealants for Solid Oxide Fuel Cells," Journal of Power Sources 147(1-2):46-57, Sep. 2005.

International Search Report dated Feb. 19, 2015, issued in corresponding International Application No. PCT/IB2014/066518, filed Dec. 2, 2014, 7 pages.

Written Opinion dated Feb. 19, 2015, issued in corresponding International Application No. PCT/IB2014/066518, filed Dec. 2, 2014, 8 pages.

* cited by examiner

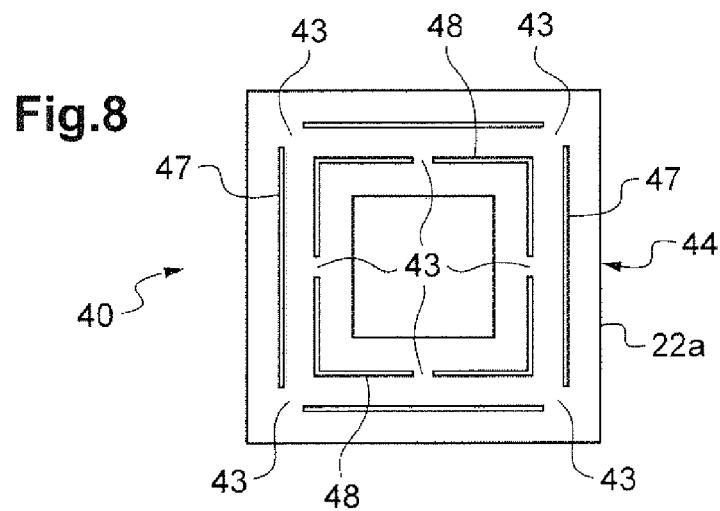
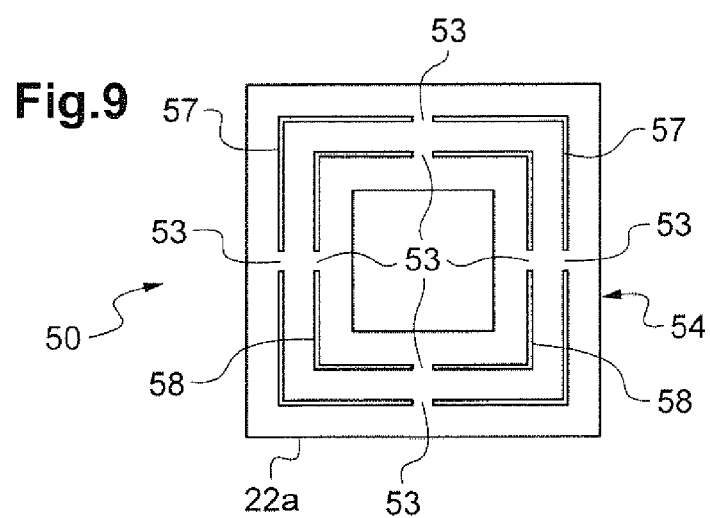
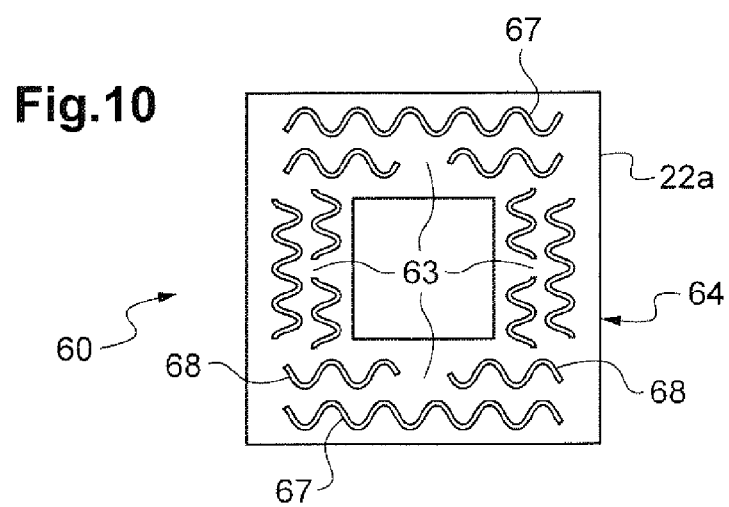

ELECTROCHEMICAL CELL CARRIER SEAL AND PROCESSES FOR MANUFACTURING AND FITTING SAID SEAL

The present invention relates to a sealed gasket which may be used in an electrochemical device, a process for manufacturing and assembling the gasket in this device and to such a device. The invention notably applies to devices forming fuel cells with solid oxides (SOFC for «Solid Oxide Fuel Cell») and steam electrolyzers at a high temperature of solid oxides (SOEC an acronym for «Solid Oxide Electrolyzer Cell»), these solid oxide electrolyzers being electrolyzers which are generically known under the acronyms of «HTE» or «HTSE» for «High Temperature Electrolysis» or «High Temperature Steam Electrolysis» respectively.

In a known way, electrochemical devices of the SOEC and SOFC type in order to be performing, require high quality seals within the different chambers which comprise them. If the seals are of good quality, then the totality of the gas sent is used by the SOEC devices and the totality of the produced gases is recovered for the SOECs and further mixing of the gases used or produced is avoided for these devices, which would be a strong penalty in the performance and durability of these devices.

These electrochemical devices usually comprise:
  at least one cell consisting of a hydrogen electrode-electrolyte-oxygen electrode assembly and defining two chambers,
  at least two electric contact elements with each cell,
  at least two metal interconnectors which conduct the current and distribute the gases (e.g. steam, dioxygen, dihydrogen, carbon dioxide and optionally a carrier gas such as dinitrogen or air) to the electrodes and which ensure the junction between two adjacent cells, and
  electrically insulating seal gaskets for avoiding any short-circuit, comprising first gaskets ensuring the seal between both chambers of each cell, second gaskets ensuring the seal between the supply of inlet gas and outlet gas and third seals ensuring the seal of the device with the outside.

In an electrochemical device of the SOEC type, the water molecule is dissociated into dihydrogen at the hydrogen electrode (cathode), the $O_2$ ions migrate through the electrolyte so as to recombine on the side of the oxygen electrode (anode) into dioxygen. Said or each SOEC cell thus produces dihydrogen by dissociating water molecules.

In an electrochemical device of the SOFC type, the oxygen is reduced at the oxygen electrode (cathode), the $O_2$ ions migrate through the electrolyte. An oxidation reaction then occurs at the hydrogen electrode (anode) and said or each SOFC cell thus produces electricity and water by combining dihydrogen and dioxygen.

The seal of the SOEC and SOFC devices is thus one of the most critical points in operation. Indeed, if a portion of the hydrogen produced in an SOEC device for example partly closed towards the outside of the device instead of being totally recovered because of a seal fault, the yield of the device is reduced.

Further, if both chambers of one cell of a SOEC or SOFC device communicate with each other, then the mixture of the gases which occurs leads to a loss of efficiency of the devices, to hot points and to a reduction of their lifetime.

For SOEC devices, it may be considered that a seal is satisfactory when 97% of the dihydrogen produced is recovered at the outlet of the device, good when this recovery level is 99% and excellent when this level is greater than 99.9%.

In addition to the recovery level, the quality of a seal may be evaluated by considering its resistance to overpressures. A seal resistant to 50 mbars (i.e. 5,000 Pa) is suitable, it is good when it resists to 200 mbars (i.e. 20,000 Pa) and excellent to 500 mbars (i.e. 50,000 Pa). The lifetime of this resistance is also an important parameter, it being specified that a seal which only resists for a few minutes is not very interesting, the targeted lifetimes being of the order of several thousands of hours.

It is known that a seal for SOEC or SOFC devices may be achieved by means of compressive gaskets, i.e. which, in order to achieve their sealing function have to be subject to compressive forces deforming these gaskets, which, upon being set into place establish the seal. This deformation of the gaskets may be reversible (e.g. elastic polymer gasket for low temperatures) or irreversible (e.g. plastic deformation of metal materials). These compressive joints are most often dense, which may be in this case polymeric or metal gaskets, or else porous such as for example mica gaskets, the compressive force being able in the latter case of filling the open internal porosities of the porous material in order to avoid leaks in its thickness.

A major drawback of the compressive gaskets of the metal type is that they do not guarantee electric insulation between the metal interconnectors and especially they require very high charge levels in order to be efficient. As to the porous electrically insulating compressive gaskets such as mica gaskets, they have the drawback of requiring compressive stresses above those tolerated by the SOFC and SOEC stacks in order to obtain satisfactory seals and are not leak-proof in their thickness. Further, with these mica gaskets the problem is posed of the expansion coefficients of the materials in contact which should be as close as possible to each other.

Moreover, it is known that the seal may be achieved by means of gaskets consisting of glass. Specially developed glasses for SOEC and SOFC applications are notably those from the family G018 (marketed by Schott), set into place and crystallized at temperatures above the operating temperatures of the stack. The temperature is then lowered to the operating temperature so that the glass gasket again becomes more rigid, which allows it to be able to resist to pressures during operation.

A major drawback of the use of glass gaskets in SOEC and SOFC devices is that if these gaskets have a too large thickness, they will not support high over-pressures (a few millibars—i.e. hundreds of Pa—are sufficient for causing flow of a glass gasket with a thickness of the order of 1 mm). Indeed, it is conceivable that a glass gasket should have the smallest possible thickness in order to limit its flow under the pressure because of its temperature of use, the glass of this gasket is never completely solidified which may cause it to flow (i.e. to be «driven out») under the effect of a pressure by virtue of the laws of flow of a fluid between two walls with a high flow rate and a reduced period of resistance to over-pressures in proportion, then leading to a loss of the seal. As a conclusion, for a same over-pressure, the lifetime of a glass gasket will be all the longer since its thickness will be reduced and its supporting surface significant. In practice, dimensional control of the glass gaskets is complex since it is also primordial to keep the portions of the stack in contact with each other which should allow good circulation of the electric current, i.e. the inter-connectors, electric contact elements and cell(s).

Another drawback of these known glass gaskets is that if the glass of the gasket establishes a seal between two metal spans but is of a too small thickness, then there is a risk of a short-circuit in the device because the glass reacts with the metal of the spans in order to form oxides which may become conducting, as indicated in the article of V. A. C. Haanappel et al., Behavior of various glass-ceramic sealants with ferritic steels under simulated SOFC stack conditions, Journal of Power Sources 150 (2005) 86-100.

As described in document EP-A2-2 522 639, it is possible to alternatively use vitroceramic glasses which have a structure may crystallize overtime, which increases the rigidity of the glass. This solution is however not optimum since the resistance to over-pressures of these vitroceramic gaskets may be insufficient.

In order to provide a solution to the aforementioned problems of dimensioning of the glass gaskets, recently, it was sought to combine in a same composite gasket a glass seal layer and a compressive material such as mica, in order to reduce the compressive constraints required and/or to improve the obtained results as compared with a gasket consisting of this single compressive material.

For example, mention may be made of document US-A-1-2009/0311570 which discloses a composite gasket for an electrochemical device consisting of mica sealed with glass deposited at its contact. Drawbacks of this composite gasket lie in the observed leaks in the thickness of the mica, in the difficulty for controlling the glass amount to be deposited because the height between the metal spans subject to dimensional variations conditions the spreading out of the glass, and in the adhesion of the glass on the mica which is generally not very resistant.

Mention may also be made of document WO-A1-2005/024280 which has a composite gasket where the glass is infiltrated into a mica, which improves the properties of a compressive gasket in mica but has the drawback of requiring a complex method and very difficult to apply because of the reduced size of the pores of the mica which makes it difficult to infiltrate the glass into the pores of a mica already shaped.

Further mention may be made of document WO-A1-2013/144167 which shows a composite gasket consisting of a massive and continuous core of ceramic covered with glass on both of its main faces, and of document US-A1-2010/0068602 which exhibits a glass/for example mica supporting plate composite gasket, wherein the glass only covers both of the main faces of the plate, which is optionally machined at the surface on both of these faces. A drawback of the latter joint is that it does not give the possibility of blocking the gas leaks in its thickness.

Finally, mention may be made of document WO-A2-2004/059761 which shows a composite gasket with various constituents such as fibers and ceramic, glass powder and a binder. A drawback of this gasket is that it requires a long series of steps so as to be shaped and consist of constituents which may pollute the chambers to be sealed and the diversity of which imparts to the gasket an uncontrolled expansion coefficient and risks of failure.

An object of the present invention is to propose a sealed gasket which may be used so as to be mounted in contact with two metal spans of an electrochemical device of the SOFC or SOEC type, the gasket comprising:
- a means for sealing the gasket comprising at least one material of the glass or vitroceramic type, and
- electrically insulating supporting means which supports the sealing means and which has two main parallel faces, an external peripheral edge and an internal peripheral edge, the gasket being capable of being mounted against these spans through these main faces, which are at least partly covered with the sealing means, which notably remedies the whole of the aforementioned drawbacks by representing a practical solution, simple to apply and inexpensive, to the aforementioned problems and giving the possibility of obtaining an excellent seal in particular for cells with a large surface area which may for example be of the order of 120×120 to 150×150 mm$^2$ and with operating temperatures typically comprised between 800 and 900° C.

For this purpose, a gasket according to the invention is such that the sealing means partitions the supporting means between said internal peripheral edge and said external peripheral edge by continuously extending from one of said main faces to the other through the supporting means, so that the sealing means directly connects these spans to each other.

By «internal peripheral edge» and «external peripheral edge», are respectively meant in the present description an edge extending along the internal and external perimeters which may be independently of each other elliptical (for example circular, if these are then circumferential edges) or polygonal (for example square), as a non-limiting example.

It will be noted that this transverse partitioning right through the supporting means by the sealing means which thus is supported on both of these spans facing each other gives the possibility of sealing the gas leaks in the thickness of the gasket, of controlling the amount of material of the glass type deposited by handling these overflows, of positioning this material exactly there where it is required and finally generating a metal/material seal of the glass/metal type of excellent quality. By means of this sealing partitioning of the supporting means, it is possible to make the latter into a non-sealed material such as a porous material, as this will be explained hereafter.

It will also be noted that this structure of the gaskets according to the invention allows great simplicity in their application within the electrochemical device and advantageously require a single constituent providing a satisfactory seal, which is said material of the glass type for which the expansion coefficient is very close to that of the metal spans which has the advantage of not being a penalty to the seal obtained with the thermal cycles.

It will further be noted that this sealing partitioning gives the possibility of suppressing the gas leaks in the edge of the material of the supporting means and of preventing oxidation of the adjacent metal spans which may generate a short-circuit in the device since the thickness of the material of the glass or vitroceramic type is large.

According to another feature of the invention, the supporting means may comprise a one-piece frame in a porous material which is machined so as to define perforated surfaces through the frame forming at least a through-channel with a predetermined geometry receiving the sealing means, said at least one channel filled with the sealing means forming at least one sealed partition continuously extending from one of the said main faces to the other.

It will be noted that said or each thereby machined channel gives the possibility of accurately positioning according to an optimum configuration (i.e. exactly at the required predetermined locations) the material of the glass type of the sealing means within the supporting means, which advantageously consist of this one-piece frame. This glassy (or vitroceramic, therefore partly crystalline) material then forms sealed partition(s) adhering in an excellent way to the metal spans, which increases the resistance of said or each partition. The dimensions of said or each seal partition (i.e. transverse height measured perpendicularly to the main faces of the frame and width measured in parallel with these faces) are completely under control since they correspond to those of the perforations or cuts initially made on the frame, and it is thus possible to produce partitions each having a small width (typically of 1 mm) which provides low bulkiness with the formation of several sealed partitions.

It will also be noted that said or each sealed partition being contained by the material of the supporting frame (mica for example), it should necessarily for flowing be slipped between this frame and the facing metal spans. As this slipping is very difficult, confinement of the sealing means of the glass type is thereby obtained, which provides an excellent seal, which it is possible to maintain for pressures above 1 bar (i.e. greater than $10^5$ Pa). Said or each perforated channel in the frame is adapted so as to receive the overflow of the sealing means during the phase for setting into place said or each gasket of the SOEC or SOFC device according to the invention at a temperature above that of operating, this overflow forming the aforementioned sealed partition between both metal spans.

As this will be explained in more detail hereafter, it will further be noted that a gasket according to the invention may be prepared before the mounting of the device and of its optional stacking of cells.

According to another feature of the invention, said surfaces of said at least one channel may be globally perpendicular to said main faces and extend in a peripheral direction globally concentric with said internal and external peripheral edges, continuously or discontinuously along said peripheral direction, tabs consisting of said frame may be formed on either side of said at least one channel for connecting the latter to the remainder of the frame or to another so called adjacent channel, each tab having a volume smaller than that of said at least one channel.

By "globally concentric peripheral direction" is meant in the present description a direction surrounding said internal peripheral edge of the frame in the form of one or several straight lines (e.g. as dashed lines and/or dotted lines), curved and/or broken, as seen in a sectional view in a plane internal to the parallel frame to its main faces (i.e., seen in a middle horizontal plane inside the frame).

It will be noted that these tabs consist of uncut frame portions which give the possibility of maintaining this frame in a single part, thereby avoiding assembling of several blocks, the accurate positioning of which relatively to each other would be impossible. These tabs are appropriately positioned so as to allow both mechanical holding of the frame and minimization of the gas leaks within it.

Preferably, said tabs are angularly shifted radially on either side of said at least one channel, for example according to a staggered arrangement, so as to maximize the length of the path of gases distributed by inter-connectors formed by said spans and/or pressure drops for these gases through said porous material of said frame.

By "radially", is meant in the present description a direction within the frame substantially passing through the center of the frame and perpendicular to the axis of symmetry of this frame.

According to a first embodiment of the invention, said at least one sealed partition continuously extends in said peripheral direction (as seen in a horizontal plane internal to the frame), said tabs extending on either side of said at least one channel towards said external peripheral edge and towards said internal peripheral edge respectively.

According to this first embodiment, a gasket according to the invention may advantageously comprise at least two so called concentric sealed partitions which are connected pair wise with each other through said radial tabs.

According to a second embodiment of the invention, said at least one sealed partition discontinuously extends in said at least one peripheral direction (as seen in a horizontal plane internal to the frame) while forming a plurality of partitioning portions which may be connected pair wise with each other in this peripheral direction by said tabs.

According to this second embodiment, a gasket according to the invention may advantageously comprise:
  at least two of said sealed partitions each formed with said plurality of partitioning portions accommodated in said channels crossing said frame which are machined according to curvilinear, rectilinear (for example like the aforementioned dashed lines), corrugated geometries and/or as broken lines and which are filled with the sealing means, or else alternatively
  a multitude of said sealed partitions which are respectively formed with a multitude of holes (for example like the aforementioned dotted lines) crossing said frame, for example cylindrical, which form so called channels machined at regular intervals between said internal peripheral edge and said external peripheral edge and which are filled with the sealing means.

With reference to this second embodiment, it will be noted that many line configurations may be used, in particular any patterns giving the possibility of maximizing the path length of the gases circulating in the thickness of the frame, or even patterns of the fractal type.

According to another preferential feature of the invention, said sealing means is based on glass or vitroceramic (i.e. in majority comprising by weight or exclusively a glass paste), and said supporting means consisting of a machined sheet in a porous material forming said frame and selected from the group formed by porous ceramics and porous minerals, preferably mica.

It will be noted that by means of the sealed partitioning of the frame according to the present invention, it is not necessary that this frame be leak-proof, which allows the use of porous materials generally, like:
  porous ceramics (for example Macor which is a porous alumina). Indeed, an advantage of the porous ceramics is that they are easily machinable, and generally less expensive when they are not 100% dense, or
  mineral porous materials such as mica, which in a known way comprises the groups of alumino-silicate minerals having a lamellar structure (mica is relatively stable in temperature, is an easy support to be machined, inexpensive and electrically insulating) and which exists under a large number of compounds from which the most common ones are biotypes (e.g. of formula $K_2(Mg, Fe)_2(OH)_2(AlSi_3)_{10}$), fuchsites (i.e. biotypes rich in iron), lepidolites (e.g. of formula $LiKAl_2(OH, F)_2(Si_2O_6)_2$), Muscovites (e.g. of formula $KAl_2(OH)_2(AlSi_3O_{10})$) and phlogopites (e.g. of formula $(KMg_3Al).(OH)Si_4O_{10}$).

The method for manufacturing an assembling according to the invention a gasket as defined above in an electrochemical device in particular of the solid oxide fuel cell (SOFC) type or solid oxide high temperature steam electrolyzer (SOEC) type, comprises:
  a) machining of the supporting means for perforating said at least one channel between said internal peripheral edge and said external peripheral edge which continuously extends from one of said main faces to the other through the supporting means, b) a deposition of the sealing means, such as a glass paste (further called "glass slurry"), on said main faces and in said at least one channel for obtaining a blank of the gasket before assembling.

c) an assembling of the gasket within a stack of at least one cell of the device at a temperature comprised between 600° C. and 900° C. and under an applied pressure of several kPa, in order to melt the sealing means while maintaining it in place.

It will be noted that the use according to the invention of a single part forming each sealed gasket gives the possibility of setting into place in a single step both almost all the gaskets of a stacking stage during the mounting of the electrochemical device of the invention.

An electrochemical device of the fuel cell with a solid oxide type (SOFC) or a steam electrolyzer at high temperature with a solid oxide (SOEC) according to the invention comprises:

at least one cell which comprises a hydrogen electrode-electrolyte-oxygen electrode assembly and which delimits two chambers, at least two electric contact elements with said at least one cell respectively positioned in contact with said electrodes, at least two metal spans forming interconnectors which distribute into said at least one cell an electric current and gases such as steam, dioxygen, dihydrogen and optionally a carrier gas and which, in the case of several so called cells, ensure the junction between the latter, and seal gaskets which are each mounted in contact with a pair of said interconnectors, and this device is characterized in that at least one these gaskets is as defined above in connection with the present invention.

Advantageously, the whole of said gaskets is electrically insulating, these gaskets comprising first gaskets ensuring the seal between the chambers of said at least one cell, second gaskets ensuring the seal between the respective supplies of inlet gas and of outlet gas and third gaskets ensuring the seal of said at least one cell with the outer atmosphere, said second and third gaskets being according to the invention as defined above.

Figure 2:
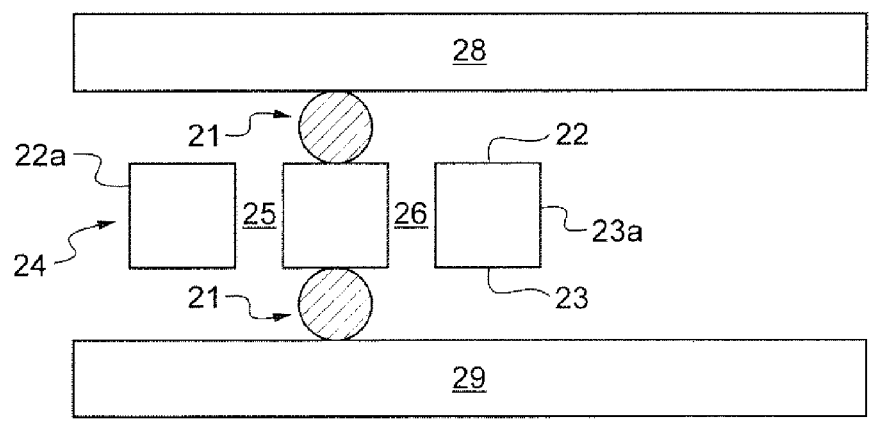
Figure 3:
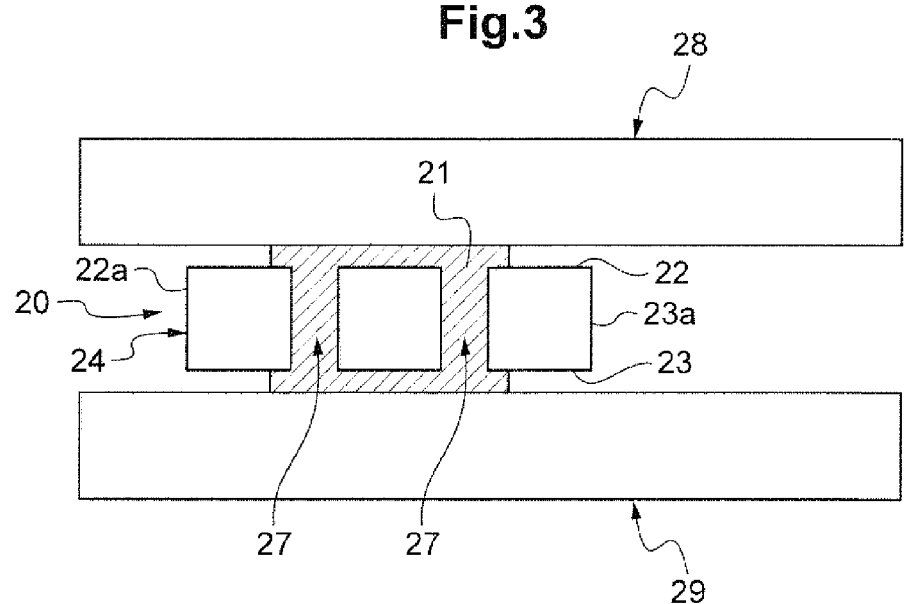
Figure 4:
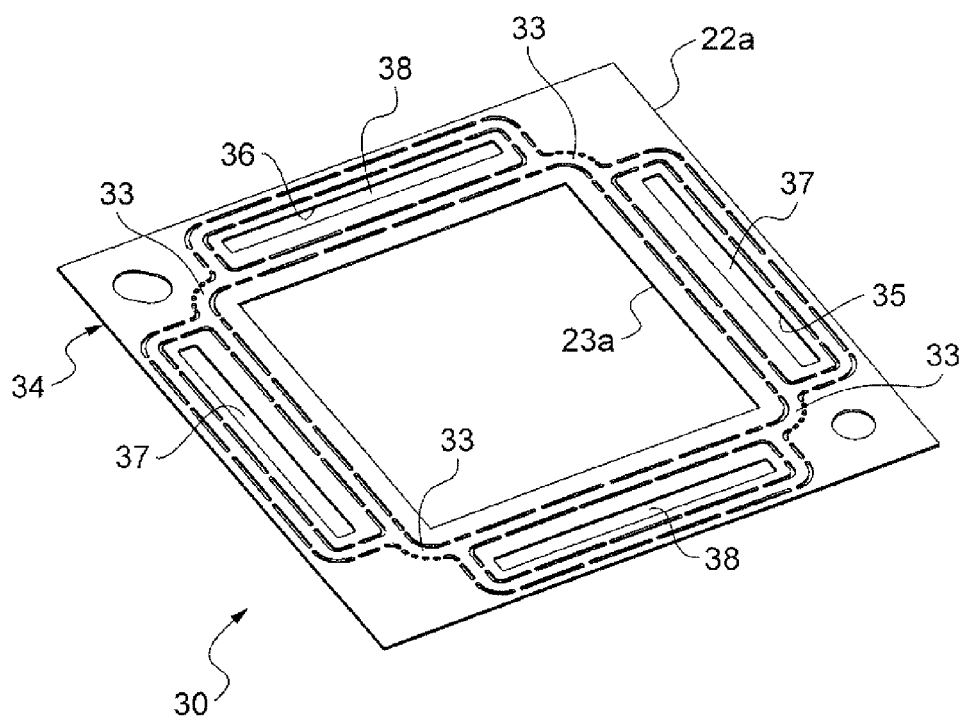
Figures 5, 6:
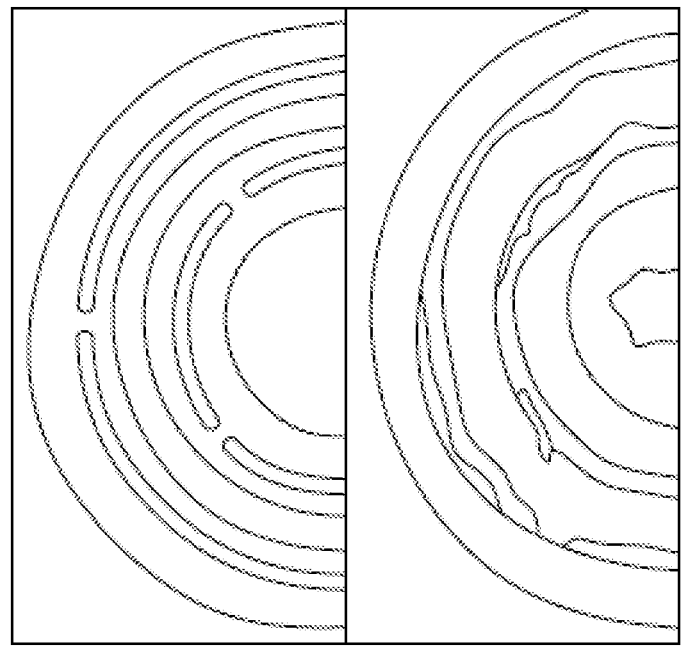
Figure 7:
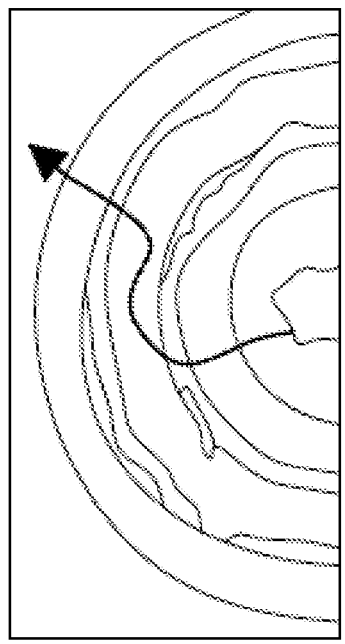
Figure 11:
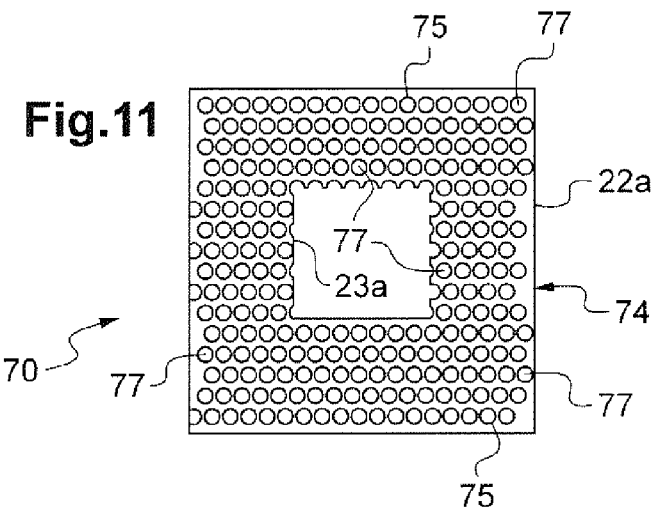
Figure 12:
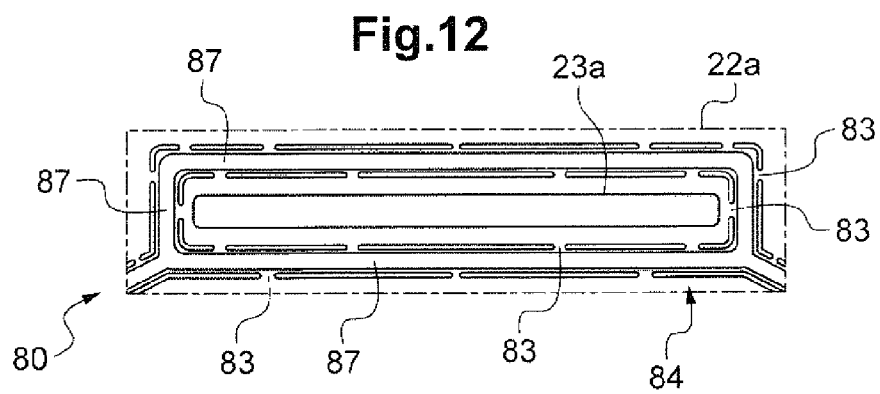
Figure 13:
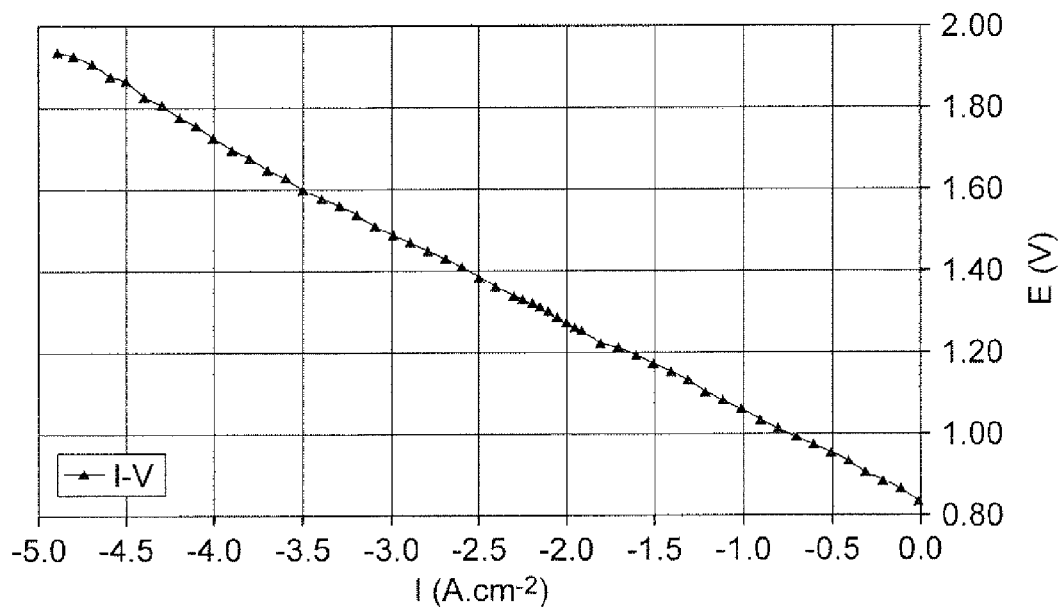
Figure 14:
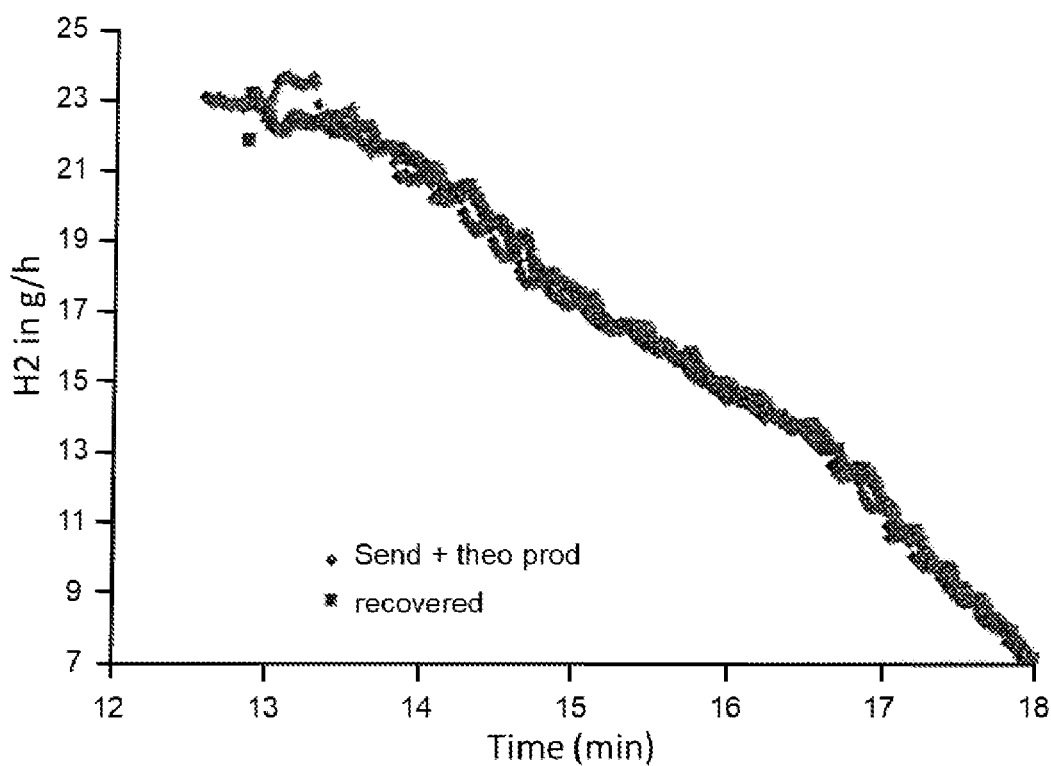
Figure 15:
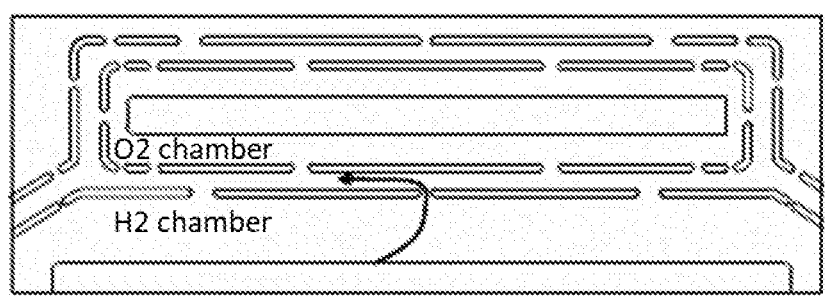

Other features, advantages and details of the present invention will become apparent upon reading the following description of several exemplary embodiments of the invention, given as an illustration and not as a limitation, said description being made with reference to the appended drawings, wherein:

FIG. 1 is a partial schematic half-cross-sectional view (in a vertical plane) of an electrochemical device SOEC or SOFC showing a typical exemplary location of seal gaskets according to the invention in this device, FIG. 2 is a partial schematic half-cross-sectional view showing a first phase of the preparation of a composite gasket according to the invention for example included in the device of FIG. 1 and mounted in contact with two inter-connectors;

FIG. 3 is a partial schematic half-cross-sectional view showing a subsequent phase of the preparation of the gasket of FIG. 2 in contact with two inter-connectors, FIG. 4 is a schematic horizontal sectional view of a gasket according to said second embodiment, in a sectional plane internal to the gasket which is parallel to the main faces of the latter, FIGS. 5 and 6 are each a photograph of a half of a gasket according to said first embodiment of the invention, showing in FIG. 5 the filling of a circular channel of the supporting frame with the sealing means and in FIG. 6 the filling of another adjacent channel, FIG. 7 is a photograph identical with FIG. 6, but further illustrating schematically by an arrow the benefit of the tabs of the frame angularly shifted for the gas path through the gasket, FIGS. 8, 9, 10 and 11 are schematic horizontal sectional views of various alternatives of a gasket according to said second embodiment of the invention, in a sectional plane internal to the gasket which is parallel to the main faces of the latter, FIG. 12 is a schematic horizontal sectional view of an alternative of a gasket according to said first embodiment of the invention, in a sectional plane internal to the gasket which is parallel to the main faces of the latter, FIG. 13 is a graph showing a current-voltage (IV) curve of a test on an SOEC device with a cell of 120×120 mm$^2$ equipped with a gasket according to FIG. 2 with a mica frame filled with glass, FIG. 14 is a graph showing the mass flow rates of produced dihydrogen and recovered overtime by this mica/glass gasket of FIG. 12, under an over-pressure of 500 mbars (50,000 Pa) for the SOEC cell, and FIG. 15 is a horizontal sectional photograph of the inside of a gasket similar to the one of FIG. 12, after disassembly of the SOEC cell subsequent to its operation for illustrating the barrier effect towards dioxygen and dihydrogen gases of both glass partitions of this gasket.

The electrochemical device 1 partly illustrated in the example of FIG. 1 comprises:

cells 2 each consisting of a hydrogen electrode-electrolyte-oxygen electrode assembly (not shown), electric contact elements 3 and 4 with each cell 2 delimiting two chambers 5 and 6 for the latter, metal interconnectors 7, 8, 9, 10, 11, 12 which bring the current and distribute the gases (e.g. steam, dioxygen, dihydrogen and optionally a carrier gas such as dinitrogen or air) to the electrodes and which ensure the junction between both adjacent cells 2, and sealed gaskets 13, 14, 15 electrically insulating in order to avoid any short-circuit, comprising first gasket 13 ensuring the seal between both chambers 5 and 6 of each cell 2, second gaskets 14 ensuring the seal between the inlet and outlet gas supplies and third gaskets 15 ensuring the seal of the device with the outside.

As visible in FIGS. 2 and 3, a gasket 20 according to the invention is made by depositing a sealing means 21, advantageously consisting of a glass paste, on both main parallel faces 22 and 23 of an electrically insulating one-piece frame 24 in the form of a sheet for example in mica (faces 22 and 23 of the frame 24 are connected together through an external peripheral edge 22a and an internal peripheral edge 23a). According to the invention, this sheet 24 is machined beforehand so as to path away therein one or several through-apertures 25, 26 with predetermined geometry(ies) which open onto both of these faces 22 and 23. The thereby deposited glass 21 will fill the apertures 25, 26 of the frame 24 so as to form therein sealed glass partitions 27 being supported on the interconnectors 28 and 29, such as those mentioned earlier with reference to the device 1 of FIG. 1.

As visible in FIG. 4, tabs 33 consisting of portions not cutout (visible in blank lines) of a gasket 30 to the frame 34 according to the invention give the possibility of maintaining the frame 34 in one piece. If the cutting out (illustrated in white by apertures 35, 36 with a rectangular section filled with sealing glass 37, 38) was continuous, there would actually be in this exemplary embodiment six parts to be assembled instead of only one and their accurate positioning relatively to each other would be impossible. The tabs 33 are suitably positioned for allowing both the mechanical hold of the frame 34 and the minimization of the gas leaks within it, and these tabs 33 generate a discontinuity of the sealed glass partitions 37, 38 filling the apertures 35, 36 in the peripheral and/or transverse direction of the gasket 30 incorporating this frame 34.

As the material preferentially used for the frame 34 (e.g. a mica) is porous, each tab 33 may be the center of a gas leak in the thickness of the frame 34, which the Applicant has demonstrated in the photograph of FIG. 15. Indeed, this FIG. 15 shows that the smaller the tab, the smaller is the passage section for the gases and the leak of these gases is all the smaller. But it should be noted that the tabs 33 do not have to be too small (i.e. not too thin nor too narrow) so as not to break during the handlings of the frame 34. In this context, the geometry shown in FIG. 4 is an exemplary embodiment giving the possibility of minimizing the width of each tab 33 for minimizing the leaks in the gasket 30.

As illustrated in the photographs of FIGS. 5 to 7, a frame for a gasket according to the invention is perforated according to at least one continuous or discontinuous line in the peripheral direction (e.g. circumferential direction), and preferably in multiple lines forming channels which, once they are filled with glass (in white) define as many seal partitions so as to totally prevent the passage of the gases (see FIG. 6). Further, the tabs which connect the channels between them are angularly positioned in a shifted way (i.e. staggered); so as to maximize the path length of the gas in the frame (see the arrow of FIG. 7 schematically illustrating the sinuous path of the gas through these tabs) and to increase the pressure drops within the gasket.

Thus and with reference to FIGS. 8 and 9, a gasket 40 with a frame 44 made according to the example of FIG. 8 with staggered tabs 43 made between discontinuous sealed partitioning portions 47, 48 in the peripheral direction, has sealed results towards gases much better than those of a gasket 50 with a frame 54 made according to FIG. 9 with radially aligned tabs 53 between sealed partitioning portions 57, 58 also discontinuous.

As illustrated in FIG. 10, provision may be made alternatively in a frame 64 of a gasket 60 according to the invention several rows of globally concentric channels which are each in non-straight lines (e.g. broken or undulated) with attachment tabs 63, in order to increase the size of the sealed partitions 67, 68 filling these channels and increasing the mechanical strength of the frame 64.

As illustrated in FIG. 11, instead of having cutout lines, it is possible to have a gasket 70 with a frame 74 perforated with a multitude of transverse holes 75 regularly spaced out and for example of circular section. These glass holes 75 are filled so as to form as many aligned sealed partitions 77 for example along a multitude of concentric rows. These holes 75 have the advantage of being easy to make and to arrange as regular rows. The limiting size of each hole 75 is given by capillarity of the glass, which has to fill the hole 75 without remaining at the surface.

With reference to the whole of the aforementioned methods and exemplary embodiments of the invention, the sealing means used by means of a robot and a pneumatic syringe is advantageously deposited as a glass paste for example of the G018type which is a mixture of commercial glass powder (e.g., a glass powder of the Schott G018-311 type mixed with a solvent of the ethanol type and with a binder of the terpineol type). The glass paste is prepared in the laboratory from this commercial glass powder and it is deposited on solid portions of the frame between two perforations which, on the one hand allows the glass to overflow into the apertures or channels of the frame according to controlled overflowing and, on the other hand facilitates the deposit and allows handling of the frame after this deposition. The glass is not deposited elsewhere, since it may overflow into the areas supplying gases of the stack of the electrochemical device. As it may easily be handled, it is possible to easily weigh the frame before and after deposition of the glass paste, which gives the possibility of easily and accurately determining the amount of thereby deposited glass.

This amount of deposited glass, which corresponds to the amount required for filling the apertures or channels of the supporting frame, is calculated as fairly as possible. The volume of the apertures or channels to be filled is calculated and the exact amount of glass required for this filling is deposited.

Often, the tolerances on the spacings between interconnectors are of the order of 50 µm. For a mica frame without any hole, an uncertainty of 50 µm in height over a glass height of 100 µm is very significant since it is of 50%, which generates overflows at undesired locations. With the grooves of the invention, as the glass volume deposited in these grooves is significant, these 50 µm will only lead to about a few % of glass in excess. Thus, the present invention makes the height variations on the chains of the sides much less critical.

The Applicant moreover conducted comparative tests not compliant with the invention with portions cutout in a mica frame not in a crossing way, but recessed in this frame (i.e. transversely blind). These comparative tests gave for the «control» gasket thereby obtained filling these recessed parts, experimental results clearly not as good, i.e. a maximum resistance to pressure of only 0.2 bars (i.e. 20,000 Pa) and no resistance to the thermal cycles.

In order to manufacture a gasket according to the invention, it is for example possible to apply the following successive steps:
  making the frame an electric insulator, e.g., a mica sheet (for example with the trade name of thermiculite 866® from Flexitallic) with a sheet thickness comprised between 0.1 mm and several mm. Alternatively, this frame may consist of any other machinable electrically insulating material;
  making through-apertures from one main face to the other of the sheet by milling, or alternatively by any other means giving a good surface condition such as for example with a laser, die-stamping or with a cutter;
  assembling the frame, glass paste and cell paste (the glass paste is for example a mixture of Schott G018-311 glass powder, of a solvent of the ethanol type and of a binder of the terpineol type), it being specified that the glass is deposited on the frame by means of a robot on the areas comprised between two grooves for the first face and that after drying in free air for few hours, the glass is deposited on the second face;

mounting the thereby obtained gasket within the stack of the electrochemical device (see FIG. 1) at a temperature of the order of 900° C. (this temperature depends on the selected glass, the temperature range to be used being given by the glass manufacturer) in order to melt the glass and set it into place. For this purpose, a load of a few kPa is applied on the stack equally before or after the temperature adjustment so as to set into place the contact elements 3 and 4 of FIG. 1. A small portion of this load is used for setting the glass into place since, as the glass is not very rigid at these temperatures, it only provides very low resistance to crushing. The load is maintained during the whole continuation of the test, and then the stack is cooled to its operating temperature (for example 800° C.) in order to allow its operation.

It will be noted that the use of a frame according to a determined cutout gives the possibility of easily obtaining a core supporting the sealing means based on glass forming a gasket according to the invention, which notably gives the possibility of finely controlling the height of each glass partition by reducing this height and therefore by improving the efficiency of the gasket in terms of the seal towards gases obtained as compared with the one obtained with larger glass heights.

Further, the use of a supporting frame according to the invention allows an alternation of barriers consisting of a glass partition and then of a glass-mica composite. The Applicant has shown that the successive barriers have a positive action on the seal towards gases, in that they allow the loss of a barrier without any loss of seal at the whole of the gasket.

FIG. 12 illustrates a test according to the invention conducted on an SOEC device with a cell of 120×120 mm$^2$, which consisted in imposing a current to an SOEC device including this cell, which was provided with a gasket 80 according to the invention with the frame 84 integrating a sealed glass partition 87 and tabs 83. The excellent seal obtained gave the possibility of having 100% of the gases sent to the cell. Thus, the current/voltage curve was obtained, visible in FIG. 13. It should be noted that if a portion of the gas sent did not reach the cell, then the curve IV would not be linear, unlike what is shown in FIG. 13.

The theoretical amount of dihydrogen ($H_2$) produced according to the imposed current was easily calculated, and the recovered amount of dihydrogen was measured. It is found that 100% of the dihydrogen produced even under 500 mbars (i.e. 50,000 Pa) of over-pressure was recovered as visible in FIG. 14. This test was conducted under more than 200 mbars (i.e. more than 20,000 Pa) for more than 400 operating hours and the seal was maintained during this period without it being altered. The obtained seals were therefore excellent. Further, these seals resisted to more than 500 mbars (i.e. more than 50,000 Pa) of over-pressure for several hours. The test was therefore stopped without this over-pressure by 50,000 Pa having caused any loss of a seal. As shown in FIG. 14, 100% of the produced dihydrogen during an IV test under 50,000 Pa of over-pressure were recovered.

The Applicant showed in the photograph of FIG. 15 the "barrier" effect of the mica-glass composite gasket according to this example of the invention during the disassembling of the cell used for this test. Actually it is seen in this FIG. 15 that:

the dihydrogen colors the mica in gray/white. Thus, a white mica is a witness of a hydrogenated atmosphere; and that both $H_2$ and $O_2$ chambers are actually leak-proof relatively to each other, since the dihydrogen passes the first glass barrier in the holding tab but does not pass the second barrier (if a dihydrogen leak had existed, the mica would be entirely colored, the dihydrogen diffusing very easily).

The invention claimed is:

1. An electrochemical device comprising: two metal spans;
   a seal gasket comprising:
   a support electrically insulating comprising a one-piece frame in a porous material selected from the group formed by porous ceramics and porous minerals, which has two main parallel faces respectively facing the two metal spans, an external peripheral edge and an internal peripheral edge,
   wherein the support is machined so as to define perforated surfaces through the frame forming at least one through-channel extending from one of the main faces to the other, with a predetermined geometry, wherein the gasket is mounted against these spans through these main faces,
   a seal supported by the support and comprising at least one material of the glass or vitroceramic type, wherein two external portions of the seal cover at least partly respectively the two main faces, wherein an internal portion of the seal fills the at least one through-channel and connects the two external portions so that the seal continuously extends from one of said main faces to the other through the support, for forming at least one sealed partition continuously extending from one of said metal spans to the other so that the seal partitions the support between said internal peripheral edge and said external peripheral edge by, directly connecting these spans to each other,
   wherein the two main parallel faces are spaced from the two metal spans by the at least one material of the glass or vitroceramic type.

2. The electrochemical device according to claim 1, wherein said surfaces of said at least one channel are globally perpendicular to said main faces and extend in a peripheral direction globally concentric with said internal and external peripheral edges, continuously or discontinuously along said peripheral direction, tabs consisting of said frame being formed on either side of said at least one channel for connecting the latter to the remainder of the frame or to another adjacent channel, each tab having a volume of less than the one of said at least one channel.

3. The electrochemical device according to claim 2, wherein said tabs are angularly shifted radially on either side of said at least one channel to maximize the length of the path of gases distributed by interconnectors formed by said spans and/or the pressure drops for these gases through said porous material of said frame.

4. The electrochemical device according to claim 2, wherein said at least one sealed partition extends continuously in said peripheral direction, said tabs extending on either side of said at least one channel respectively towards said external peripheral edge and towards said internal peripheral edge.

5. The electrochemical device according to claim 4, wherein the gasket comprises at least two said concentric seal partitions which are connected pairwise to each other through said radial tabs.

6. The electrochemical device according to claim 2, wherein said at least one sealed partition extends discontinuously in said at least one peripheral direction while forming a plurality of partitioning portions.

7. The electrochemical device according to claim 6, wherein the gasket comprises at least two sealed partitions each formed with said plurality of partitioning portions accommodated in said channels crossing said frame which are machined according to curvilinear, rectilinear, undulated geometries and/or as broken lines and which are filled with the seal, these partitioning portions being connected pair wise with each other in the peripheral direction through said tabs.

8. The electrochemical device according to claim 6, wherein the gasket comprises a multitude of said sealed partitions which are respectively formed with a multitude of holes crossing said frame, which form said channels machined at regular intervals between said internal peripheral edge and said external peripheral edge and which are filled with the seal.

9. The electrochemical device according to claim 1, wherein the seal is based on glass or vitroceramic, and in that the support consist of a machined sheet in the porous material selected from the group formed by porous ceramics and porous minerals including mica.

10. A method for manufacturing and assembling a gasket in an electrochemical device, wherein the method comprises:
   (a) machining of a support electrically insulating comprising a one-piece frame in a porous material selected from the group formed by porous ceramics and porous minerals, which has two main parallel faces respectively facing two metal spans, an external peripheral edge and an internal peripheral edge, for perforating at least one through-channel from one of said main faces to the other through the support,
   (b) depositing a seal, such as a glass or vitroceramic paste, onto said main faces and in said at least one through-channel for obtaining a blank of the gasket before assembling; and
   (c) assembling the gasket within a stack of at least one cell of the device, comprising two metal spans, at a temperature comprised between 600° C. and 900° C. and under an applied pressure in order to melt the seal while setting the seal into place, so that two external portions of the seal cover at least partly respectively the two main faces of the support, wherein an internal portion of the seal fills the at least one through-channel and connects the two external portions so that the seal continuously extends from one of said metal spans to the other through the support, for forming at least one sealed partition continuously extending from one of said main faces to the other so that the seal partitions the support between said internal peripheral edge and said external peripheral edge by, directly connecting these spans to each other,
   wherein the two main parallel faces are spaced, respectively, from the two metal spans.

11. An electrochemical device of the solid oxide fuel cell (SOFC) type or solid oxide high temperature steam electrolyzer (SOEC) type, the device comprising:
   at least one cell which comprises a hydrogen electrode-electrolyte-oxygen electrode assembly and which delimits two chambers,
   at least two electric contact elements with said at least one cell respectively positioned in contact with said electrodes,
   at least two metal spans forming interconnectors which distribute into said at least one cell an electric current and gases; and
   seal gaskets which are each mounted in contact with a pair of said interconnectors,
   wherein at least one of said gaskets is a gasket comprising:
      a support electrically insulating comprising a one-piece frame in a porous material selected from the group formed by porous ceramics and porous minerals, which has two main parallel faces respectively facing the two metal spans, an external peripheral edge and an internal peripheral edge, wherein the support is machined so as to define perforated surfaces through the frame forming at least one through-channel extending from one of the main faces to the other, with a predetermined geometry, wherein the gasket is mounted against these spans through these main faces,
      a seal supported by the support and comprising at least one material of the glass or vitroceramic type, wherein two external portions of the seal cover at least partly respectively the two main faces, wherein an internal portion of the seal fills the at least one through-channel and connects the two external portions so that the seal continuously extends from one of said metal spans to the other through the support, for forming at least one sealed partition continuously extending from one of said main faces to the other so that the seal partitions the support between said internal peripheral edge and said external peripheral edge by, directly connecting these spans to each other,
   wherein the two main parallel faces are spaced, respectively, from the two metal spans.

12. The electrochemical device according to claim 11, wherein the whole of said gaskets are electrically insulating and comprise first gaskets ensuring the seal between the chambers of said at least one cell, second gaskets ensuring the seal between respective supplies of inlet gases, and outlet gases and third gaskets ensuring the seal of said at least one cell with the outer atmosphere, said second and third gaskets each comprising:
   a seal of the gasket comprising at least one material of the glass or vitroceramic type, and
   a support electrically insulating, which supports the seal and which has two main parallel faces, an external peripheral edge and an internal peripheral edge, the gasket being able to be mounted against these spans through these main faces, which are at least partly covered with the seal,
   wherein the seal partitions the support between said internal peripheral edge and said external peripheral edge by continuously extending from one of said main faces to the other through the support, so that the seal directly connects these spans to each other.

13. The electrochemical device according to claim 1, wherein it comprises one of a solid oxide fuel cell (SOFC) type and a solid oxide high temperature steam electrolyzer (SOEC) type.

14. The electrochemical device according to claim 3, wherein said tabs are angularly shifted radially on either side of said at least one channel along a staggered arrangement.

15. The electrochemical device according to claim 8, wherein at least one of the multitude of holes crossing said frame is a cylindrical hole.

16. The method of claim 10, wherein the electrochemical device comprises one of a solid oxide fuel cell (SOFC) type and a solid oxide high temperature steam electrolyzer (SOEC) type.

17. The electrochemical device according to claim 11, wherein the gases comprise at least one of steam, dioxygen, dihydrogen, and a carrier gas.

* * * * *